Patented Aug. 7, 1934

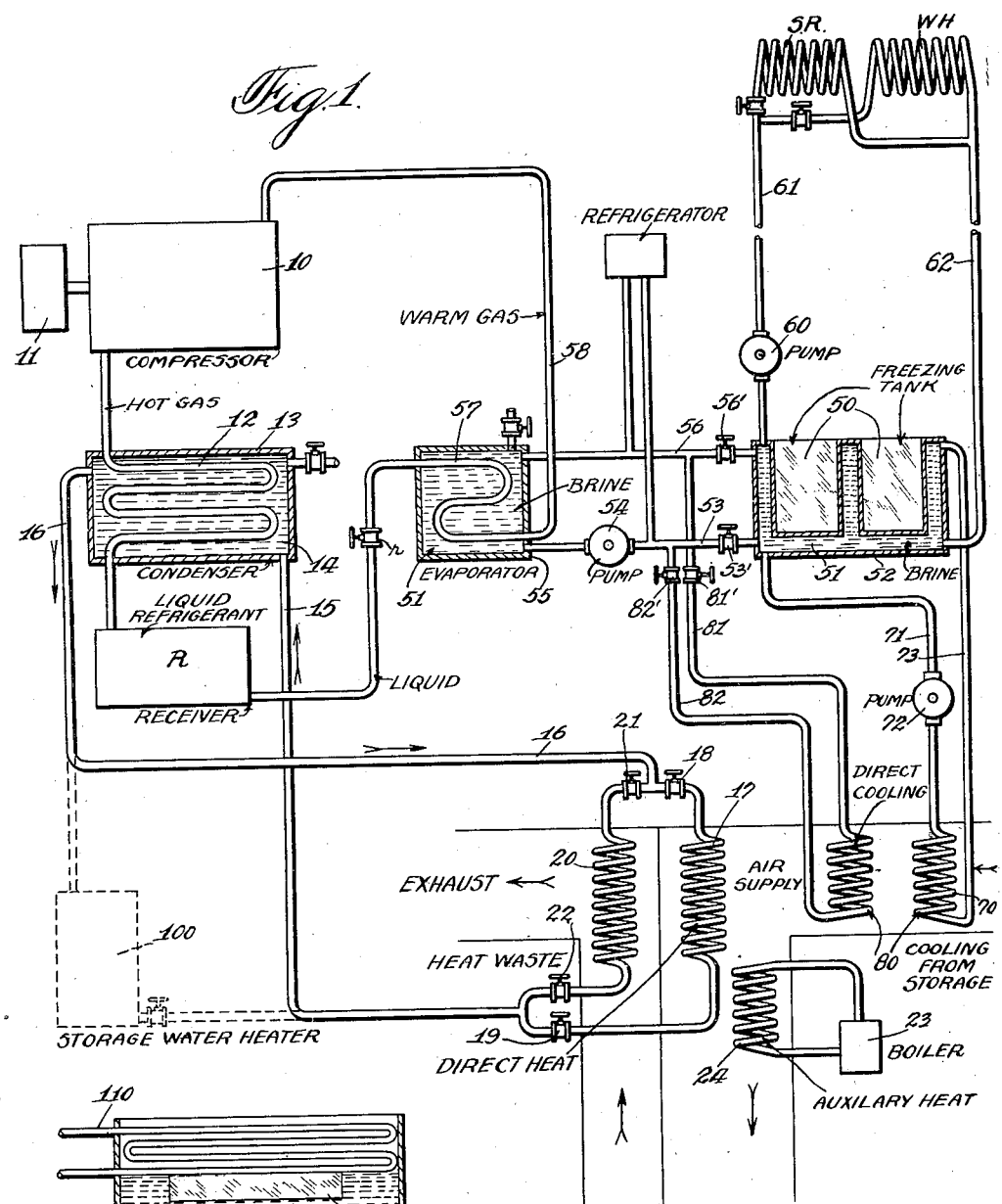
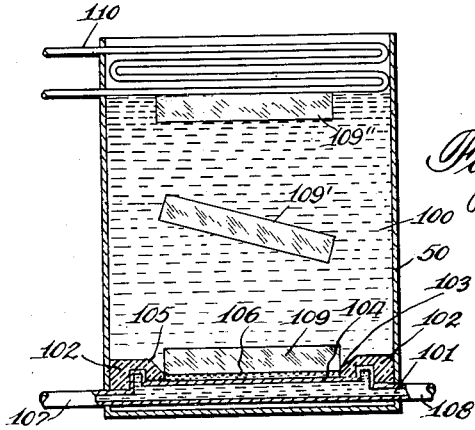

1,969,187

UNITED STATES PATENT OFFICE 1,969,187

HEAT BALANCING SYSTEM

Clifton E. Schutt, Wheaton, Ill.

Application February 19, 1932, Serial No. 593,949

11 Claims. (Cl. 257—8)

The present invention relates to a heat balancing system devised to recover and interchange heat by mechanical means, the heat being recovered at relatively low temperature but delivered at a higher and hence usable temperature.

The field of application of the present invention is of great breadth and may find its utilization in space heating and cooling for air conditioning, for the operation of driers and dehydrating plants, for cooling molds in die-casting plants, and for any other operations—physical or chemical—that at some stage or cycle of their operations require heating and cooling either simultaneously or alternately.

The broad underlying principles of the invention consist in the employment of a refrigerating system in which a suitable refrigerating medium such as a low-boiling gas or liquid is employed, being suitably compressed by means of mechanical expedients so as to raise the temperature of the said gas to a point appreciably above that of the surrounding atmosphere. The heat thus produced, by raising to a higher level the heat content in the gas plus the heat introduced thereinto by the mechanical work done upon the gas by the compressing means, is transferred by usual methods of heat transfer to a liquid which may be circulated through heat radiating means serving to heat any given space such, for example, as the interior of a house. Simultaneously with the transfer of the heat from the compressed gas through the transfer flue there will be a concomitant reduction of the temperature of the gas under compression, resulting in the liquefaction thereof.

Upon subsequent expansion of this gas through suitable expansion valves, the temperature thereof will greatly drop, and this expansion may be used for the purpose of refrigeration. Now, however, it is contemplated, in accordance with the present invention, to supply heat to the expanding gas derived from the freezing of a liquid or partially liquefied product, the radiant heat of fusion thereof being quite considerable, so that a fairly large amount of heat in the form of B. t. u. or calories may be introduced into the expanded gas and therefore back into the refrigerating phase of the system so that on subsequent recompression the temperature attained will be much higher due to the heat input derived from the liquid in passing to a lower temperature or to partial or complete solidification.

The refrigerating effect is moreover also employed for the partial or total solidification of a liquid into a partially or totally solid condition, thereby tying up or storing refrigeration in the form of ice or cooled liquid, the frozen or solidified liquid forming a potential source of refrigeration which may be employed for whatever cooling may be desired, by causing it to absorb heat from the body or area to be cooled.

The specific application of the invention described herein will be in connection with the heating, cooling, and air conditioning of a house or residence of, say, from seven to eight rooms. In the system about to be explained, heat will be extracted both from the air and from solar radiation, and from flue gas, and be employed for the heating of the building. At the same time, there will be described, in connection with the equipment, means for cooling the building during the warm seasons of the year and for heating the building during the cold seasons.

In order to enable a thorough understanding of the invention to be had, reference is directed to the drawing, in which Figure 1 is a purely diagrammatic representation of the flow of energy in the form of heat in carrying out the heating and cooling of, say, an eight or ten-room house, while Figure 2 is a detail of a water-freezing and ice-melting device that forms a part of the mechanical expedients employed in connection with carrying out the invention.

In other words, concisely stated, the invention contemplates the heating of a residence by means of the heat abstracted from compressed gas in a refrigerating cycle plus additional heat from any suitable heat dispensing means such as from a gas, coal, or oil burning furnace coupled with means for storing ice produced by the said refrigerating cycle, the said ice to be used during the warmer season of the year for the cooling of the building, provisions also being made for abstracting out of the flue of the heating device as much of the therein contained remaining heat units or calories as possible and also to introduce into the system such solar radiated heat as may be made available by suitable heat abstracting coils or absorbers located on the roof of the building or at any other suitable location. It is contemplated to store a considerable quantity of ice during the winter-time, which ice will gradually be melted during the course of the summer, thereby serving to augment the direct cooling. It is contemplated to run the refrigerating machine during the entire twelve months of the year, thereby furnishing the greater part of both heating and cooling requirements by direct mechanical means. Also, since there is available a continuously cooled system and a continuously heated system, the household refrigerator may be connected to the cooling system and the hot water storage system connected to the hot water pipes.

Mathematical considerations have shown that a considerable excess of ice will be produced during the colder months, and provisions are made for disposing of this ice, preferably by the waste heat in the flue and by the solar absorption coils located on the roof of the building.

In order to avoid creating the conception that the present invention is a perpetual motion machine or a device for getting something for nothing, the following statements are made regarding its operation:

*I*

There are no violations of thermodynamic laws in the cycle of operation.

*II*

It is a generally recognized thermodynamic law that heat flows only from a body of higher to a body of lower temperature. This law should be qualified to state, however, that heat can flow from a lower to a higher temperature by compensation. It is on this qualified statement of the law that the herein described heat compensating machine operates. The compensating feature in the present invention is the mechanical energy input provided in the form of electrical energy which drives the motor that drives the compressor for the compression stage of the refrigerating cycle.

*III*

The change in entropy in the cycle of operation is always in conformity with the thermodynamic law regarding the degradation of energy; that is, the total entropy increases throughout. There is in the present exemplification hereinbelow described no point in the cycle that demands that more energy be available for the production of mechanical work than has been expended in doing mechanical work. This means, therefore, that the heat recovered must be used for other purposes than for the direct creation of mechanical work.

The system about to be described has been carefully worked out for the heating and cooling of an eight to ten-room residence at about 42° north latitude and in a climate about that existing in the neighborhood of the Great Lakes, although with suitable modifications the system can, of course, be applied to warmer climates as well as to colder climates; but the numerical values of the various units given hereinbelow are to be taken as fairly representative in and about the region of Lake Michigan, where the average temperature throughout the year varies from very slightly below zero to a maximum of 97° F. On such a basis the heating and cooling requirements will be so correlated that heating will be required during the months of January to about the middle of June, refrigerating requirements from the latter part of April and through to about the middle of October, and heating requirements for the balance of the year.

Since all that is required to change the plant from a cooling system to a heating system is to close valves 81' and 82' and open valves 53' and 56'; during such times in the cooling season as the capacity of the plant is not required for cooling the building, heat may be withdrawn from storage (50) and delivered to either coil 17 or dissipated in coil 20. By thus replacing some of the stored refrigeration, the total capacity of the storage space may be made smaller and at the same time a higher load factor on the power plant will be maintained. Thus the variation in temperature as between maximum and minimum during the twenty-four hour cycle as well as the variation from day to day can be utilized to further control the ice storage and thereby decrease the cost of installation of storage capacity. The liquid or ice in storage will simply act as a storage battery for heat, giving heat when required and absorbing heat when refrigeration is required.

It is also to be taken into consideration that the average temperature to be maintained in a given residence will be 72° F. throughout the year, irrespective of outside temperatures; that is to say, whether it be cold or hot. That this is a highly desirable condition is well recognized, as 72° F. is considered the most healthful temperature in which to remain for any length of time.

Inasmuch as by the present system it is also possible to control fairly accurately the humidity of a given space, the value of the invention will be all the more apparent.

Referring now to the drawing (Fig. 1), it will be seen that the apparatus consists of a refrigerating cycle comprising a compressor 10 operated by suitable driving means such as an electric motor 11, or a gas-engine, Diesel engine or other source of motive power which may be chosen or selected, depending upon economical considerations. This compressor, working with ammonia gas or other refrigerant, compresses the gas above its critical pressure and then forces it into coils 12 in a condenser tank 13. Surrounding the coils within the tank 13 is a supply of water 14 which flows into said tank in the direction of the arrows through pipe 15 and leaves the same again in the direction of the arrows through pipe 16. Heat in a compressed ammonia gas is thus transferred to the water flowing through pipe 15, the tank 13 and the pipe 16, the water being thereby heated to a temperature of about 130° to 140° F. Assuming now that the operation is taking place during the colder months, the said water will be directed into coil 17 by opening valves 18 and 19, coil 20 being kept inactive by keeping valves 21 and 22 closed. The coil 17 is preferably located in an air duct through which air coming from the outside atmosphere or air that is recycled from the space or rooms being heated passes in the direction of the arrows. In order that there may be an additional supply of heat during cold weather, there is an auxiliary heat-supplying device consisting of a boiler 23 and a therewith associated steam coil 24, the latter being likewise located in a duct leading to the space to be heated. It will be seen that the heat derived initially from the gaseous refrigerating medium is thus transferred to the space to be heated.

There is, however, another source of heat which also enters the space to be heated, this heat being derived from the water contained in the freezing tanks 50, two of these being shown in the drawing. This heat is derived by lowering the temperature of the water by means of brine 51 which is circulated around the freezing tanks 50 in a tank 52, passing through pipes 53 and pump 54 into an evaporator 55 and returning to the tank 52 through pipe 56. Valves 53' and 56' are open during this operation.

It will be obvious that as the liquefied refrigerating medium contained in the receiver R passes the expansion valve r and enters the coil 57 in the evaporator 55, this will lower the temperature of the brine in the said evaporator 55 and will hence abstract heat from the water contained in the tanks 50. Therefore, 1 B. t. u. of heat will be derived from each pound of water in the said tanks for each degree Fahrenheit drop in temperature. With an additional quantity of heat, when the water is frozen into ice at 32° F., the amount of heat thus made available is equal to the latent heat of fusion of the ice, which is 80 calories per gram or equivalent to 144 B. t. u. per pound of ice formed from one pound of water at 32° F. It will be readily appreciated that the heat derived from freezing of the water will appear in the expanded gas leaving the evaporator through the pipe 58 and will thus also appear in the compressor 10, where—by the operation of the motor 11—the gas is again compressed and raised to a higher temperature, but the temperature attained is greater because of the heat existing in the gas (irrespective of its temperature), this heat being derived from the latent heat of fusion of ice, i. e., the heat that is given off when a pound of water at the freezing point turns into a pound of ice at the freezing point.

The amount of heat thus made available will depend upon the amount of water available for freezing. If the amount of water is very great, it may not be necessary to freeze the water; for example, if a large body of water such as a lake or pond were available, the difference existing between the surface temperature and the temperature deeper down in the lake or pond would suffice for the purpose. However, in commercial installations, such as in the present case, it is best to utilize the latent heat of fusion to produce ice in order to obtain the additional B. t. u. thus set free.

As during the winter months, the only refrigeration really desired will be in the household refrigerator and possibly for the freezing of water for a small skating pond or the like, there will, during cold weather, be produced an excess of ice, and this must either be disposed of or melted. This melting can very readily be accomplished by utilizing the waste heat that is escaping through the chimney of the boiler 23 by placing into the flue a coil which, for the sake of simplicity of the diagram, appears in the extreme upper right of the drawing as coil WH, this being known as the waste heat coil.

The heat thus transferred from the flue gases to the coil will be transferred to the brine that is circulated through the said coil by means of the pump 60 and the connecting lines 61 and 62. Inasmuch as this raises the temperature of the brine, the waste heat is thus transferred to the evaporator and therefore to the expanded gas and eventually reappears in the coil 17 going into the heat supply for the space to be heated.

However, there is an additional source of heat available by the employment of a solar radiation coil which appears in the upper right-hand corner of the drawing, adjacent the coil WH just described, being designated as coil SR, which is a solar radiation coil that is preferably located on the roof of the building, where the sun may shine directly upon it. It is a well known fact that the solar radiation constant is practically the same in summer as in winter, the only difference being that in the winter-time the hours of sunlight on clear days are less than on corresponding days in the summer-time. However, irrespective of the temperature which surrounds the coil, the amount of heat in the form of radiant energy absorbed thereby—assuming for purposes of illustration that this coil is a black coil of maximum absorption power—will have the same value in the summer-time as in the winter-time, and any radiant heat absorbed thereby will therefore be transferred to the brine and eventually appear in the evaporator and hence finally in the heating coil 17. The heat thus introduced will, of course, minimize the amount of ice formed, but in the heat balance existing in the exemplification at present under discussion there will still be an excess of ice, and this must be removed by melting the same by passing an electrically heated wire therethrough or, preferably, merely by running tap water in and out of the fuel so as to melt some of the ice while cooling the tap water which is allowed to run to waste. The latter is, in the case exemplified, the cheapest method of melting the ice and is hence to be preferred.

With equipment such as that shown, the excess amount of ice formed during the entire year will be about 107 tons, and the amount of ice that it is desired to have in storage at the beginning of summer or, say, June 15th will be from 67 to 75 tons. This ice will then be available for cooling the air in the space to be cooled; i. e., within the house, the cooling being effected by means of the coil 70 which is supplied with cold brine 51 from the tank 52 through the pipe 71 and pump 72, being returned to the tank 52 through the pipe 73.

Additional refrigeration, preferably under thermostatic control, is secured by the employment of a further refrigerating coil 80 also located in the duct leading to the space to be cooled and supplied with brine directed from the evaporator through the pipes 81 and 82, these pipes being provided with valves 81' and 82' which, although shown as hand-controlled, may be readily adapted to thermostatic control in ways which are well known and hence need not be specifically described.

During such season of the year as it is not desired to heat the space in the house, but rather to cool it, the hot water flowing in line 16 is diverted into coil 20, which is located in the duct leading from the space to be cooled to the outer air, this heat then being radiated away, with the exception of such hot water as may be desired to be stored in the storage water heater 100 for domestic purposes.

To sum up the operations, it may be stated that at all times the refrigerating fluid during its expansion is absorbing heat from the brine in the evaporator, the said heat being in part derived from the freezing of water in the tanks 50, the heat derived from the brine, and hence incidentally also from the water being delivered at an increased temperature to the water in the condenser 13.

During the heating season, therefore, the coil 17 is delivering heat to the incoming air or to the circulated air derived from the space to be heated, as the case may be. This heat, it will be noticed, is derived partly from the water stored in the tanks 50 and partly represents converted mechanical energy coming from the motor 11 and the compressor 10. At times of low temperature, i. e., during the winter season, the auxiliary source of heat, namely, the boiler 23 and the therewith associated coil 24, goes into action, supplying additional heat to the space to be heated. This auxiliary heat may be derived from any standard heating equipment fired by gas, coal, or oil. On the other hand when the temperature of the circumambient air increases to a point requiring cooling and conditioning of the air within the space controlled, namely, during the summer season, the valves 81' and 82' controlling the supply of brine to the coil 80 will open, thus allowing the brine to circulate through the coil 80 so as to cool the air entering the space under control. The coil 17 may then act as a tempering coil, or the coil may be inactivated and coil 20 employed instead to waste the necessary heat. When, however, the required cooling—by reason of the increase in the outer temperature—exceeds the capacity of the refrigerating cycle, the pump 72 will automatically be started to circulate cold brine through the coil 70 from the tank 52, thereby raising the temperature of the brine and hence melting some of the ice. It is the stored ice then that during the maximum summer temperatures supplies the amount of the required refrigeration over and above what can be supplied direct from the refrigerating cycle. Therefore, during the summer-time the valves 53' and 56' will be closed and brine at low temperatures circulated by means of the pump 54 from the evaporator 55, through pipes 81 and 82 and coil 80, and brine at about the freezing point of water will be circulated through the coil 70 to its connections already described, thereby serving to melt the ice which has been accumulating during the cold season.

Depending upon the height of the outer temperature, the refrigeration may be effected also by coil 80 directly through the cold produced by the evaporation of the liquefied gas in the expansion coil 57. It is contemplated to operate the refrigerating unit throughout the entire year, but the speed at which it operates and hence the amount of ice produced will be in accordance with the thermal demands and will be under the control of thermostatically operated valves which, however, are not a part of the present invention, as they are standard equipment which may readily be adapted, without any essential change, to the throwing on and off of the necessary motor for the operation of the required valves.

In connection with the ice-storage equipment, reference is directed to Fig. 2, showing one exemplification of means for freezing water and for thawing ice so as to have a device that at no time will be burst by the pressure caused by the expansion of water incident to its freezing. In Fig. 2 there is provided a freezing tank 50 containing a supply of water 100. This tank is provided, near the bottom thereof, with a hollow plate 101 which for a portion of its upper surface is insulated by means of insulating material 102. This plate has such a configuration that the upper surface forms a sort of dish or trough 103, the bottom of which is constituted by the upper surface 104 of the hollow plate, and the sides thereof of the inclined portions 105 of the said insulating material 102. Resting upon the upper surface 104 there is a thin layer of metallic mercury 106 which, as is known, is an excellent conductor of heat and hence will be at the same temperature as the brine that is being circulated to the plate 101 through the pipes 107 and 108.

As the brine is below the freezing point of water, ice 109 will begin to form upon the mercury surface 106; and inasmuch as mercury and ice are not mutually adherent, the ice block—when it has reached a certain thickness, say an inch or two—will have acquired sufficient buoyancy, for the reason that ice has a lesser specific gravity than water, to detach itself from the mercury surface and float upwards, as indicated at 109', eventually arriving at the top of the tank as indicated at 109'', where the tank of ice will contact with the thawing-coil 110 through which water may be circulated, being derived from any convenient source of water. However, the coil 110 may be a steam coil, a hot-air coil, or may, if desired, be replaced by an electrically heated coil or plate. It will thus be seen that by the provision of the freezing plate 101 and the thawing coil 110 in connection with the mercury freezing surface 106, there is an operative means for forming, storing, and destroying ice, as may be required, the plate 101 having the brine circulated therethrough in the same manner as the brine is circulated through tanks 52 and 55 in Fig. 1. It is, however, to be understood that while this specific description of the ice producing, storing and melting means is common, the invention is not limited thereto but that any suitable means for accomplishing these results will be strictly within the scope of the present invention.

Where the plant is located on the shores of a large body of water such as a pond, a lake, or the sea, it will not be necessary to employ the freezing equipment; but the cold water necessary for refrigeration may immediately be taken from the deep part of the lake while the brine coils may be imbedded in a part of the lake or sea close to the surface, where high temperatures are available. It will be seen that with an arrangement such as shown in the present invention the heat content in the warmer water will be abstracted and will appear in the condenser water, and this will be made available for the heating of the space which is under the control of the apparatus.

The fundamental principle is the abstraction of heat from a supply of water at a low temperature and the utilization of this heat at a higher temperature by mechanical compensation for the heating of a given space and the storing of ice, which latter—during that part of the year when refrigeration is desired—will form means for abstracting heat from the atmosphere in the given space, so that it becomes possible by means of a comparatively simple system to maintain a given space—such as a residence, theatre, store, or the like—at a uniform temperature throughout the year, irrespective of meteorological conditions.

Without implying any limitations but merely as an exemplification of a specific installation, there are appended at this point data for the size of the coils in terms of square feet of radiation surface when employed for the heating and cooling of an eight-room residence at about 42° north latitude on the American Continent, and at about the longitude of Illinois.

| Coil | Square feet |
| --- | --- |
| 20 | 160 |
| 17 | 115 |
| 24 | 200 |
| 80 | 160–170 |
| 70 | 280 |
| SR | 160–170 |
| WH | 40 |

These coils will have to handle approximately the following maximum B. t. u. per hour:

| Coil | B.t.u. per hour |
| --- | --- |
| 20 | 32,100 |
| 17 | 32,100 |
| 24 | 64,000 |
| 80 | 24,000 |
| 70 | 43,000 |
| SR | 14,000 |
| WH | 18,000 |

The device is, of course, also applicable for the operation of a drier; for instance, the cooling coils may be employed for removing moisture from a supply of air and the heating coils utilized to reheat the dried air, so that dry, warm air will be available for carrying out dehydration operations such, for example, as the drying of fruits, vegetables, and commercial products.

The motive power for the operation of the compressor, as already stated, may consist either of an electric motor or an internal combustion engine such as a Diesel engine, gas engine or liquid fuel engine, whichever proves to be most economical for the particular installation. If such an internal combustion engine is employed, there will, of course, become available further heat, namely that of the cooling water used in cooling the cylinder walls of the said engine, as well as the heat available in the exhaust gases. This heat may be utilized at any point in the present system, for example, for the melting of excess ice or for the heating of the given space.

Other applications, such as the heating and cooling of railroad cars and refrigerator cars, and the operation of cold storage plants where a portion of the space is to be heated—for instance, office space—are all within the possibilities and scope of the present invention, which is to be interpreted by the hereunto annexed claims.

I claim:

1. The method of heating and cooling a given space which comprises employing a refrigerating cycle to lower the temperature and to freeze a body of relatively freezable liquid, whereby the latent heat of solidification is transferred to said refrigerating cycle, appearing in the condenser portion thereof as heat; circulating brine through heat abstracting means located in said space, and employing the heat thus transferred to the brine for melting the frozen liquid.

2. The method of heating and cooling a given space which comprises abstracting heat from a compressed condensable gas in a refrigerating cycle, expanding said refrigerant gas, whereby heat is absorbed, thereby lowering the temperature of a supply of brine; employing the thus cooled brine to freeze a quantity of water, supplying heat to said given space by a fuel consuming device, and abstracting waste heat from said fuel supplying device for raising the temperature of said brine to effectuate the melting of a portion of said ice.

3. In a heat balancing apparatus of the type described the combination of a gas compressor, means for condensing the compressed gas to form a liquid whereby heat is liberated, means for radiating said heat into a given space, means for evaporating the condensed liquid thus formed, means for supplying heat to said evaporator, a freezing unit capable of furnishing heat to said evaporator with resultant cooling of the materials to be cooled therein, an auxiliary apparatus for supplying heat to said space, and means for utilizing the waste heat of said latter apparatus and transferring the same to the freezing apparatus.

4. In a heat balancing apparatus of the type described the combination of means for heating and cooling a given space, said means comprising, on the one hand, a compressed gas refrigerating unit and means connected with the former for utilizing the heat of compression for the heating of said space and, on the other hand, a freezing unit from which heat is abstracted and introduced into the refrigerating cycle, means for radiating the heat from the compression stage of the refrigerating unit into the given space, and means connected with said freezing unit to cool said space.

5. In a heat balancing apparatus of the type described the combination of means for heating a given space, comprising a combustion unit and a chimney connected therewith; a gas refrigerating unit consisting of a compressor, a condenser, an expander, and an evaporator; a freezing unit connected with said evaporator; means for circulating brine through said freezing unit and evaporator in series; means connected with said refrigerating unit to abstract heat from said chimney; means connected with the condenser portion of said refrigerating unit to radiate heat into said space; and means connected with said freezing unit for lowering the temperature of a body of liquid therein.

6. In a heat balancing unit the combination of a refrigerating cycle consisting of a gas compressor, a condenser for compressed gas, a receiver for the liquid thus produced, an expansion valve and an evaporator for said liquid to re-form a gas, said evaporator containing brine; a freezing unit consisting of a container for brine, said container and evaporator being operatively connected together; means for forcibly transferring brine from and to said evaporator and freezing unit; heat-absorbing means connected with the brine chamber of said freezing unit; means for radiating heat from the condenser of said refrigerating unit into a given space; independent means for heating said space; means for absorbing waste heat and conducting the same into the brine circuit of said freezing unit; and means for circulating brine through said first mentioned absorbing means.

7. In an apparatus for maintaining a given space at a constant temperature irrespective of the temperature of the atmosphere, the combination of means for heating said space, means for refrigerating said space, means for freezing a body of liquid, said refrigerating and heating means respectively being interconnected, whereby the heat produced by the compression cycle of said refrigerating unit is employed to heat the given space and the heat of solidification abstracted from said liquid is imparted to the refrigerating cycle and thus likewise employed for heating said given space, and means connected with said refrigerating and freezing units respectively to cool said given space.

8. In a heat balancing system of the type described the combination of a refrigerating cycle and a freezing cycle, means for lowering and raising the temperature of a given space, means for absorbing heat from solar radiation, and means for transferring the heat thus obtained to the freezing unit to raise the temperature therein and to cause evaporation of the compressed gas in said refrigerating cycle.

9. A heating unit utilizing the latent heat of solidification of water for the heating of a given space, which comprises means for freezing water, means for thawing the ice formed, a brine container and circulating system operatively interconnected with each other, a refrigerating cycle comprising a brine-heated evaporator for the volatile refrigerant thereof, means for compressing the refrigerant gas, means for cooling the resultant heated compressed gas, and means for radiating the heat thus imparted to the gas-cooling means into the said space.

10. A heat balancing system of the type described comprising in combination the following:— (1) a refrigerating cycle consisting of an electric motor-driven gas compressor, a water-cooled condenser for the compressed refrigerating gas thereby produced, a receiver for the condensed liquid refrigerant, an expansion valve and evaporator for said refrigerant to convert the same back into a gas, and means for leading said gas to the intake side of said compressor; (2) a freezing apparatus comprising a container for brine, said container being operatively connected with the evaporator of the refrigerating system aforesaid, a duct leading to the space to be heated, internally hollow heat absorbing means located in said duct and connected with the brine circulating system, internally hollow heat radiating members located in said duct and connected with the cooling-water system that is connected to the condenser of the refrigerating cycle aforesaid; (3) auxiliary heating means capable of radiating heat into said duct; (4) internally hollow heat absorbing means located in said duct for extracting waste heat therefrom; (5) internally hollow heat absorbing means capable of absorbing solar radiation, said means being connected with the brine circulating system; (6) means for pumping brine through the evaporator of the refrigerating system and the brine tank of the freezing system; and (7) means for melting ice formed in said freezing system.

11. A freezing unit comprising a container, means for circulating cold brine through the bottom of said container, a layer of mercury on said means, and means for imparting heat to the upper portion of said container to melt ice formed therein.

CLIFTON E. SCHUTT.